United States Patent
Hofmann

(10) Patent No.: US 8,941,029 B2
(45) Date of Patent: Jan. 27, 2015

(54) METHODS AND SYSTEMS FOR KEYHOLE-FREE LASER FUSION CUTTING

(75) Inventor: Tobias Hofmann, Heerbrugg (CH)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 343 days.

(21) Appl. No.: 12/797,966

(22) Filed: Jun. 10, 2010

(65) Prior Publication Data

US 2010/0308025 A1   Dec. 9, 2010

Related U.S. Application Data

(63) Continuation of application No. PCT/DE2008/002039, filed on Dec. 9, 2008.

(30) Foreign Application Priority Data

Dec. 11, 2007   (DE) .......................... 10 2007 059 987

(51) Int. Cl.
| | |
|---|---|
| B23K 26/00 | (2014.01) |
| B23K 26/38 | (2014.01) |
| B23K 26/06 | (2014.01) |
| B23K 26/14 | (2014.01) |

(52) U.S. Cl.
CPC ............. B23K 26/38 (2013.01); B23K 26/0608 (2013.01); B23K 26/0613 (2013.01); B23K 26/1405 (2013.01)
USPC ............. 219/121.72; 219/121.67; 219/121.68

(58) Field of Classification Search
USPC ............... 219/121.6, 121.61, 121.72, 121.65, 219/121.66, 121.67, 121.68
See application file for complete search history.

(56) References Cited

U.S. PATENT DOCUMENTS

| | | | |
|---|---|---|---|
| 6,586,707 B2* | 7/2003 | Boyle et al. ............... | 219/121.69 |
| 2002/0017513 A1 | 2/2002 | Nagura et al. | |
| 2002/0088094 A1* | 7/2002 | Barclay et al. ............. | 24/30.5 R |
| 2004/0045323 A1* | 3/2004 | Schultz et al. ................. | 65/392 |
| 2006/0186098 A1 | 8/2006 | Caristan | |
| 2010/0044353 A1 | 2/2010 | Olsen | |

FOREIGN PATENT DOCUMENTS

| | | |
|---|---|---|
| DE | 19846368 | 4/2000 |
| DE | 102006012984 | 10/2007 |

(Continued)

OTHER PUBLICATIONS

Translation of International Preliminary Report on Patentability and Written Opinion for corresponding PCT Application No. PCT/EP2009/002039, mailed Jul. 15, 2010, 7 pages.

(Continued)

*Primary Examiner* — Henry Yuen
*Assistant Examiner* — Ayub Maye
(74) *Attorney, Agent, or Firm* — Fish & Richardson P.C.

(57) ABSTRACT

The invention relates to methods and systems for keyhole-free fusion cutting of a workpiece, wherein the workpiece is melted by a laser beam along a cutting joint and the molten mass produced is expelled from the produced cutting joint, e.g., by a gas jet at high pressure. According to the new methods at least one laser beam follows the laser beam in the cutting direction and influences the molten mass in such a manner that at least one of the two cutting flanks of the workpiece has a better cutting quality than when cutting without the trailing laser beam.

21 Claims, 2 Drawing Sheets

(56) References Cited

FOREIGN PATENT DOCUMENTS

| | | |
|---|---|---|
| EP | 0882540 | 12/1998 |
| EP | 1918062 A1 | 5/2008 |
| JP | 02034291 | 2/1990 |
| JP | 2000202678 | 7/2000 |
| JP | 2002273588 | 9/2002 |
| JP | 2004358521 | 12/2004 |
| JP | 2004358521 A * 12/2004 | ............. B23K 26/06 |
| WO | 2008052547 A1 | 5/2008 |

OTHER PUBLICATIONS

International Search Report from corresponding PCT Application No. PCT/DE2008/002039, received Sep. 28, 2009, 7 pages.

* cited by examiner

METHODS AND SYSTEMS FOR KEYHOLE-FREE LASER FUSION CUTTING

CROSS-REFERENCE TO RELATED APPLICATIONS

This application is a continuation of and claims priority under 35 U.S.C. §120 to PCT/DE2008/002039, filed on Dec. 9, 2008, and designating the U.S., which claims priority under 35 U.S.C. §119 to German Patent Application No. 10 2007 059 987.2, filed on Dec. 11, 2007. The contents of the prior applications are hereby incorporated by reference in their entirety.

TECHNICAL FIELD

The present invention relates to methods and systems for keyhole-free fusion cutting of workpieces.

BACKGROUND

In known conventional laser fusion cutting operations, a laser beam produced with a $CO_2$ laser or a solid-state laser melts the material and inert gas (for example, nitrogen or argon) is used to blow the molten mass and cinders downwards out of the cutting joint at high pressure. The characteristics of the melt bath and the melt flow vectors that occur therein are dependent on absorption. In contrast to conventional laser fusion cutting operations, with so-called "keyhole" laser fusion cutting not only is the material melted, but vapor is also produced. When the vapor is discharged, it applies pressure to the molten mass and ousts it, whereby a narrow vapor capillary (keyhole) is produced in the material. The vapor capillary is surrounded by the molten mass and moves with the laser beam through the workpiece.

When cutting steels using $CO_2$ lasers, it may be assumed that, in view of the narrow Brewster angle maximum, only a locally limited region of the cutting front absorbs the laser radiation in an optimum manner. Thus, the surface temperature of the molten mass does not reach the boiling point. In the case of relatively thick metal sheets, the molten mass is thereby expelled primarily at the apex of the cutting front. This results in a melt flow vector that changes only slightly along the cutting front, because there is no surface vaporization in this instance. The result is a very orientated, compact melt discharge cone, as is known in $CO_2$ fusion cutting.

When a solid-state laser is used with a wavelength in the region of approximately 1 μm, the Brewster angle and the position of the Brewster maximum, and consequently the absorption, change in comparison with the $CO_2$ laser with a wavelength of 10.6 μm. The changed absorption along the cutting front leads locally to surface evaporation with high temperature gradients. This results in changes of the temperature-dependent surface tension of the molten mass at the apex of the cutting front and consequently also in melt flow vectors that have not only exclusively vertical, but also horizontal portions. These flow vectors become less stable over time and lead to a poor base corrugation appearance of the cutting edge and to significant cutting edge roughness known in solid-state laser fusion cutting operations.

Previous laser beam fusion cutting operations using solid-state lasers to cut high-grade steels having a sheet thickness of more than 2 mm generally have a poor cutting edge quality, with significant burr formation and oxidation at the cutting flanks. Possible process windows are often very small in comparison with $CO_2$ laser beam processes and furthermore, in particular in the central and thick sheet regions, poor roughness values result at the cutting flank.

SUMMARY

An object of the invention is therefore to develop laser fusion cutting methods and systems that provide improved cutting quality such as, for example, to minimize cutting edge roughness, and in particular during laser cutting with such wavelengths and intensities that previously led to increased horizontal melt flow vector portions on the workpiece.

This object is achieved, at least in part, by the use of at least one trailing laser beam that follows the first or leading laser beam in the cutting direction and influences the molten mass in such a manner that at least one of the two cutting flanks of the workpiece has a better cutting quality, in particular a reduced cutting edge roughness, than without the trailing laser beam.

The leading laser beam is moved along the cutting joint to be formed and carries out the actual cut, while the trailing laser beam influences the cutting front in such a manner that better conditions are produced for the discharge of molten mass. This is carried out by the discharge of the molten mass, e.g., at the apex of the cutting front of the leading laser beam being influenced by the trailing laser beam. The melt portion(s) of the leading beam, which otherwise lead to the known undesired rough surfaces, e.g., a corrugation appearance in solid-state laser fusion cutting operations, can thereby be expelled, e.g., by an inert gas jet, without significantly influencing the subsequently formed cutting flank before they solidify and lead to a poor corrugation appearance. According to the new methods, the melt flow, which is determined by the absorption behavior at an appropriate angle of impact, and in particular by the gradient of the surface tension of the molten mass, is influenced in the cutting gap along the cutting front. When the new methods are used, for example, with high-power solid-state lasers, mean roughness values with a material thickness of 5 mm can be reduced by up to 25% compared with conventional single-spot laser technologies.

In one embodiment of the new methods, the trailing laser beam strikes the workpiece in a manner laterally offset relative to the cutting direction of the leading laser beam. The parts of the molten mass of the leading laser beam strike the melt flow of the laterally offset laser beam, which increases the temperature level of the oncoming molten mass and reduces the melt viscosity. The horizontal melt flow portions of the trailing laser beam are thus reduced because of the smaller molten mass volume and consequently cause less of the undesired corrugation appearance and roughness of the cut surface. In some embodiments, the trailing laser beam strikes the workpiece in a manner laterally offset by a maximum of the diameter of the leading laser beam and, with respect to the leading laser beam, laterally offset by an angle of approximately from 20° to 70°, e.g., 30° to 60° or approximately 40° to 45°, relative to the cutting direction (e.g., as shown in FIG. 2). With only one asymmetrically trailing laser beam, only one cutting flank (good side) is improved. With two symmetrically trailing laser beams, one on each side of the leading beam, both cutting flanks can be improved, that is to say, two good sides can be achieved.

In another embodiment, the trailing laser beam strikes the workpiece in a manner that is not laterally offset relative to the leading laser beam and has a larger diameter than the leading laser beam.

The leading laser beam and the trailing laser beam can at least partially overlap on or in the workpiece, and the focal point of the leading laser beam and the focal point of the trailing laser beam can be offset relative to each other in the beam direction or the cutting direction. Because the leading laser beam carries out the actual cut and the trailing laser beam is intended only to influence the cutting front, the power of the leading laser beam is preferably greater than the power of the trailing laser beam, e.g., distributed in a ratio of approximately 60:40, e.g., a ratio of about 80:20, 70:30, or 55:45. However, in some embodiments, the two beams can have the same power, e.g., a ratio of 50:50.

The leading laser beam and the trailing laser beam can be produced by a solid-state laser having a wavelength of less than 10 μm, e.g., approximately 1 μm or less, and can be two beams created from the same laser beam, for example, by means of a bifocal optical unit. Using a beam splitter, the bifocal optical unit substantially splits the basic beam into two beams, which are then focused on the metal sheet surface using the optical cutting unit. In place of a bifocal optical unit, it is also possible to use a diffractive optical unit that does not produce two beams, but instead simulates a multi-beam arrangement, for example, by means of a triangular beam formation with corresponding intensity distribution. Alternatively, it is possible to work with one or two linear focal points.

Other advantages of the invention will be appreciated from the claims, the description, and the drawings. The features mentioned above and those set out below can be used individually or together in any combination. The embodiments shown and described are not intended to be a definitive listing, but are instead intended by way of example to describe the invention.

DETAILED DESCRIPTION

Figure 1:
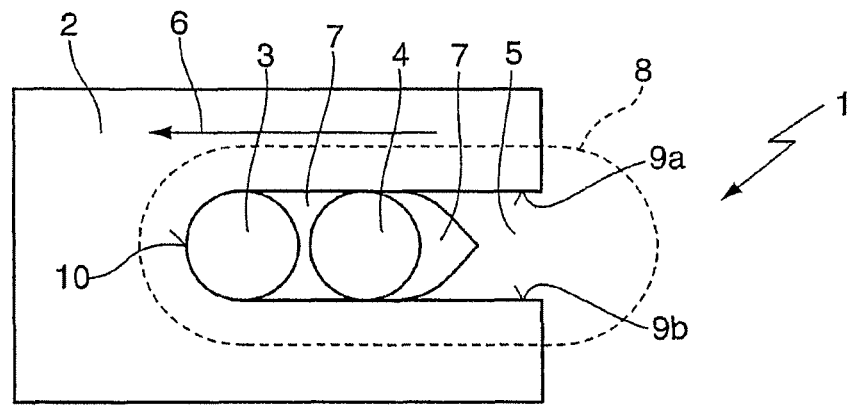
FIG. 1 is a schematic top view of a first implementation of the methods described herein, wherein a leading laser beam and a centrally trailing laser beam each strike the workpiece with the same energy.

FIG. 1 illustrates a beam arrangement 1 used for laser fusion cutting of a workpiece 2 by means of a leading laser beam 3 and a centrally trailing laser beam 4, which both strike the workpiece 2 from above. The leading laser beam 3 is moved along the cutting joint 5 to be produced in the cutting direction 6 and carries out the actual cut with cutting flanks $9a$ and $9b$. The resulting molten mass 7 is expelled downwards from the cutting joint 5 produced at high pressure by means of an inert gas jet which is discharged from a nozzle 8 shown in dashed lines, because the view is from above and the view is through the nozzle. The trailing laser beam 4 follows in the cutting direction 6 and can have the same beam diameter on the workpiece 2 and the same energy as the leading laser beam 3. The advantage of this beam arrangement is a faster cutting speed compared with conventional laser fusion cutting without the trailing laser beam 4.

In all the configurations shown, the focal point of the trailing laser beam 4 is therefore arranged in the trailing portion of the cutting front 10 and tests have been carried out with a bifocal optical unit (focal distance 150 mm) and the smallest point spacing between the two focal points of the laser beams 3, 4 in this embodiment was shown to be about 300 μm. During the tests, this smallest point spacing of 300 μm was adjusted and examined, because it can be seen from the calculated focused beam caustics that larger point spacings lead to a lower level of illumination of the cutting front, because a large part of the energy of the trailing laser beam does not reach the cutting front and is thereby propagated through the cutting gap without being used.

Figure 2:
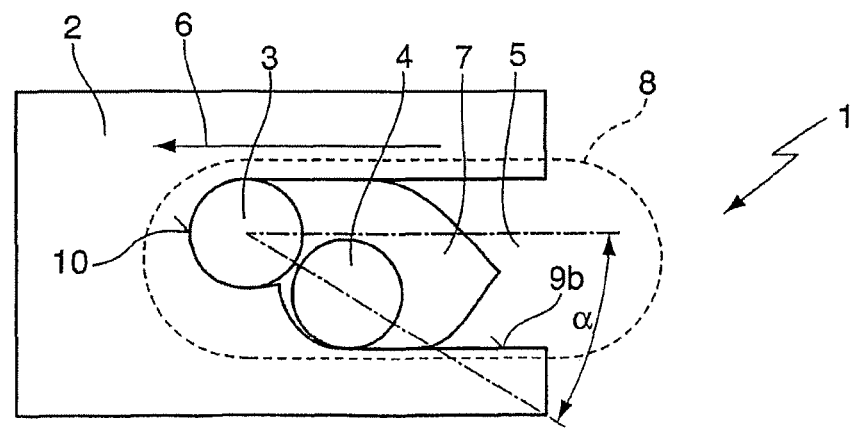
FIG. 2 is a schematic top view of a second implementation of the methods described herein, wherein a leading laser beam and a laterally offset trailing laser beam each strike the workpiece with the same energy.

With the beam arrangement 1 illustrated in FIG. 2, the trailing laser beam 4 strikes the workpiece 2 in a manner laterally offset relative to the leading laser beam 3 and, for example, with the same energy and, for example, with the same beam diameter as the leading laser beam 3. The trailing laser beam 4 strikes the workpiece 2 in a manner laterally offset approximately by the beam radius of the leading laser beam 3, and substantially by an angle α of approximately 20° to 70°, e.g., 30° to 60° or approximately 40° to 45°, e.g., 40, 41, 42, 43, or 44°, relative to the leading laser beam 3. The distance d of the two foci of the leading and trailing laser beams is in the range of 0.1 mm to 3.0 mm, e.g., 0.3±0.1 mm, and accordingly, the lateral offset is given by the equation, lateral offset=d×sin α, and the back offset is given by the equation, back offset=d×cos α.

Portions of the molten mass 7 of the leading laser beam 3 are contacted by the laterally offset, trailing laser beam 4, which increases the temperature level of the oncoming molten mass 7 and reduces the melt viscosity. As tests have shown, the molten mass 7 and the cutting front 10 are influenced by the laterally offset, trailing laser beam 4 in such a way that the cutting flank $9b$ of the workpiece 2 closest to the trailing laser beam 4 has a better cutting quality, in particular a lower cutting edge roughness than without the trailing laser beam 4. Obviously, the melt portions of the leading laser beam 3, which lead to the known, poor corrugation appearance with solid-state laser fusion cutting, are expelled by the inert gas jet from nozzle 8 without significant influence on the cutting flank that is later formed before they solidify and lead to the undesired corrugation appearance.

Figure 3:
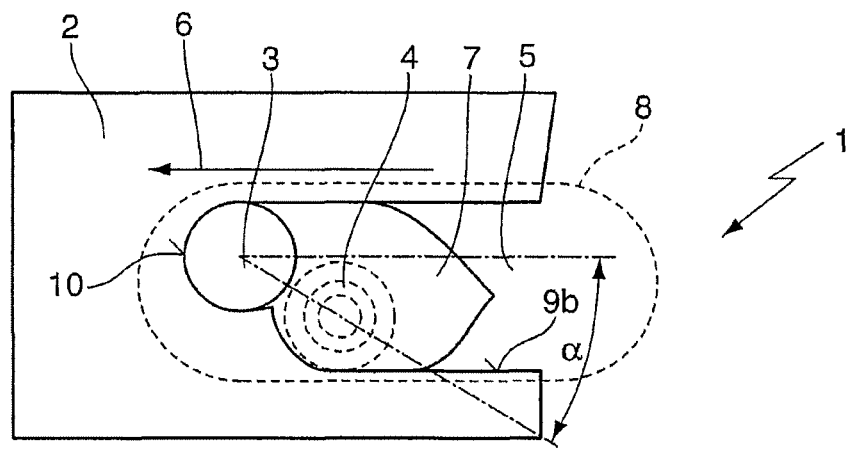
FIG. 3 is a schematic top view of a third variant of the method according to the methods described herein, wherein a leading laser beam and a laterally offset trailing laser beam strike the workpiece with differing energy.

The beam arrangement 1 illustrated in FIG. 3 differs from the beam arrangement of FIG. 2 only in that in this instance the two laser beams 3, 4 do not have the same energy, but instead the leading laser beam 3 has a higher energy level than the trailing laser beam 4. As tests for an energy distribution of 60:40 have shown, the molten mass 7 is also influenced in this instance by the laterally offset trailing laser beam 4 in such a manner that the cutting flank $9b$ closest to the trailing laser beam 4 has a better cutting quality, in particular a lower cutting edge roughness than without the trailing laser beam 4. Otherwise, FIG. 3 is similar to FIG. 2.

Figure 4:
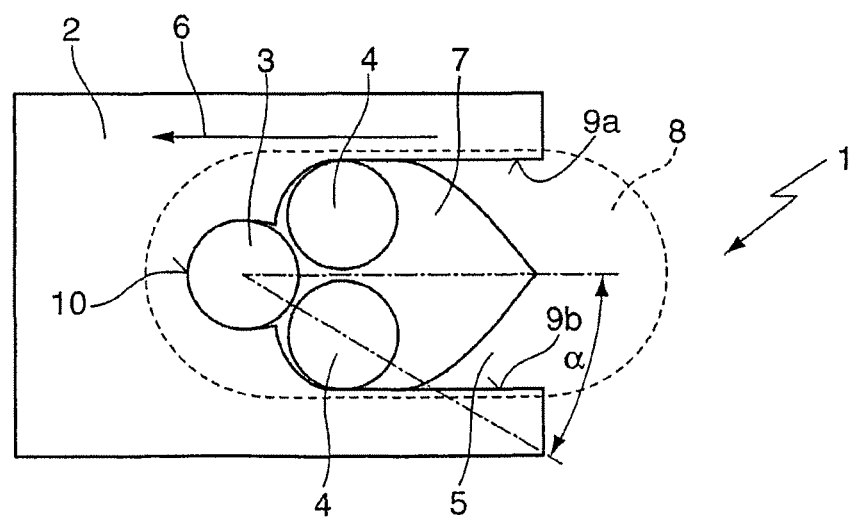
FIG. 4 is a schematic top view of a fourth implementation of the methods described herein, wherein a leading laser beam and a laterally offset trailing laser beam at each of the two sides each strike the workpiece with the same energy.

With the beam arrangement 1 illustrated in FIG. 4, the leading laser beam 3 is followed on both sides by two laser beams 4, one on each side of the leading beam, each of which is laterally offset by an angle α as described herein relative to the leading laser beam 3, and whereby both cutting flanks $9a$, $9b$ of the workpiece 2 have a better cutting quality than without the trailing laser beam 4.

In tests with a bifocal optical unit, different focal point positions were also adjusted, that is to say, focal point position 0 mm (focal points of the laser beams 3, 4 located at the upper side of the workpiece) and focal point positions −1 mm and −2 mm (focal points of the laser beams 3, 4 located in the workpiece).

In the course of the bifocal tests, it was found that the embodiment with a laterally angularly offset trailing laser beam 4 at 40° with a changed beam splitter ratio of the leading and the trailing laser beam 3, 4 of 60:40 achieved the lowest (best) roughness values. To this end, the mean roughness depths of the cutting flank were measured at three measurement positions, of 0.5 mm from the upper and lower side of the metal sheet and in the center, the roughness values increased towards the lower side of the workpiece. In the embodiment with a non-laterally angularly offset, trailing laser beam 4 and in the embodiment with a laterally angularly offset, trailing laser beam 4 at 40° with a beam splitter ratio of the first and second laser beam 3, 4 of 50:50, the roughness values were in each case higher than in the first embodiment mentioned, but still better than without the use of the trailing laser beam.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for keyhole-free fusion cutting of a workpiece, the method comprising
    melting the workpiece with a leading laser beam along a cutting joint thereby forming two cutting flanks and a molten mass that is expelled from the cutting joint by a gas jet;
    applying a second, trailing laser beam to the workpiece to follow the leading laser beam in a cutting direction and to impact the molten mass to improve a cutting quality of at least one of the two cutting flanks of the workpiece compared to cutting without the trailing laser beam,
    striking the workpiece with a central beam axis of the trailing laser beam in a manner laterally offset behind a central beam axis of the leading laser beam in a direction transverse to the cutting direction.

2. The method of claim 1, wherein the trailing laser beam influences the molten mass of the leading laser beam in a region of the cutting front of the leading laser beam.

3. The method of claim 1, wherein the central axis of the trailing laser beam strikes the workpiece in a manner laterally offset by a distance approximately equal to a diameter of the leading laser beam.

4. The method according to claim 1, wherein the central axis of the trailing laser beam strikes the workpiece with respect to the central axis of the leading laser beam in a manner laterally offset by an angle of approximately from 20° to 70°, relative to the cutting direction.

5. The method of claim 1, wherein two trailing laser beams, which are each laterally offset relative to the leading laser beam, follow the leading laser beam on each side of the cutting direction.

6. The method of claim 1, wherein the leading laser beam and the trailing laser beam at least partially overlap on or in the workpiece.

7. The method of claim 1, wherein a focal point of the leading laser beam and a focal point of the trailing laser beam are offset relative to each other in the beam direction.

8. The method of claim 1, wherein a power of the leading laser beam is greater than a power of the trailing laser beam.

9. The method of claim 8, wherein the power of the leading and trailing beams is distributed in a ratio of approximately 60:40.

10. The method of claim 1, wherein either one or both of the leading laser beam and the trailing laser beam has a wavelength of less than 10 µm.

11. The method of claim 1, wherein at least the leading laser beam is produced by a solid-state laser.

12. The method of claim 1, wherein the leading laser beam and the trailing laser beam are two partial beams of the same laser beam.

13. A method for keyhole-free fusion cutting of a workpiece, the method comprising
    melting the workpiece with a leading laser beam along a cutting joint thereby forming two cutting flanks and a molten mass that is expelled from the cutting joint by a gas jet;
    applying a second, trailing laser beam to the workpiece to follow the leading laser beam in a cutting direction and to impact the molten mass to improve a cutting quality of at least one of the two cutting flanks of the workpiece compared to cutting without the trailing laser beam;
    striking the workpiece with a central beam axis of the trailing laser beam in a manner laterally offset behind a central beam axis of the leading laser beam in a direction transverse to the cutting direction,
    wherein discharge of the molten mass at an apex of a cutting front of the leading laser beam is influenced by the trailing laser beam.

14. The method of claim 13, wherein a central axis of the trailing laser beam strikes the workpiece in a manner laterally offset to a central axis of the leading laser beam by a maximum of a diameter of the leading laser beam.

15. The method of claim 13, wherein a central axis of the trailing laser beam strikes the workpiece with respect to the leading laser beam in a manner laterally offset by an angle of approximately from 20° to 70°, relative to the cutting direction.

16. The method of claim 13, wherein two trailing laser beams, which are each laterally offset relative to the leading laser beam, follow the leading laser beam on each side of the cutting direction.

17. The method of claim 13, wherein the leading laser beam and the trailing laser beam at least partially overlap on or in the workpiece.

18. The method of claim 13, wherein a focal point of the leading laser beam and a focal point of the trailing laser beam are offset relative to each other in the beam direction.

19. The method of claim 13, wherein the power of the leading and trailing beams is distributed in a ratio of approximately 60:40.

20. The method of claim 13, wherein either one or both of the leading laser beam and the trailing laser beam have a wavelength of less than 10 µm.

21. The method of claim 13, wherein at least the leading laser beam is produced by means of a solid-state laser.

* * * * *

UNITED STATES PATENT AND TRADEMARK OFFICE
CERTIFICATE OF CORRECTION

PATENT NO. : 8,941,029 B2
APPLICATION NO. : 12/797966
DATED : January 27, 2015
INVENTOR(S) : Tobias Hofmann Page 1 of 1

It is certified that error appears in the above-identified patent and that said Letters Patent is hereby corrected as shown below:

In the Claims

In Claim 1, column 5, line 39, delete "beam," and insert --beam;--.

In Claim 9, column 6, line 7, after "trailing" insert --laser--.

In Claim 20, column 6, line 55, after "trailing" insert --laser--.

Signed and Sealed this
Sixteenth Day of June, 2015

Michelle K. Lee
*Director of the United States Patent and Trademark Office*